(12) United States Patent
Paul (10) Patent No.: US 8,845,792 B2
(45) Date of Patent: Sep. 30, 2014

(54) FILTERING NANOPARTICLES BY BONDING WITH MICROPARTICLES

(75) Inventor: Manibrata Paul, Kolkata (IN)

(73) Assignee: Empire Technology Development LLC, Wilmington, DE (US)

( * ) Notice: Subject to any disclaimer, the term of this patent is extended or adjusted under 35 U.S.C. 154(b) by 401 days.

(21) Appl. No.: 13/263,998

(22) PCT Filed: Jan. 12, 2011

(86) PCT No.: PCT/IB2011/000037
§ 371 (c)(1),
(2), (4) Date: Oct. 12, 2011

(87) PCT Pub. No.: WO2012/069890
PCT Pub. Date: May 31, 2012

(65) Prior Publication Data
US 2012/0174774 A1   Jul. 12, 2012

(30) Foreign Application Priority Data

Nov. 23, 2010  (IN) ............................ 2785/DEL/2010

(51) Int. Cl.
*B01D 46/30*  (2006.01)
*B01D 47/06*  (2006.01)

(52) U.S. Cl.
CPC ............ *B01D 47/06* (2013.01); *B01D 2221/14* (2013.01)
USPC ................... 95/274; 95/275; 95/277; 55/474; 55/512; 55/518

(58) Field of Classification Search
USPC .............. 55/351, 474, 512, 518; 95/107, 108, 95/109, 274, 275, 277; 210/265, 268
See application file for complete search history.

(56) References Cited

U.S. PATENT DOCUMENTS 3,296,775 A  *  1/1967  Squires ........................... 95/276
3,847,094 A  *  11/1974  Taeymans et al. ............ 110/216
(Continued)

FOREIGN PATENT DOCUMENTS

CA        2706274         12/2010
CA        2706274 A1  *  12/2010
(Continued)

OTHER PUBLICATIONS

International Preliminary Report on Patentability for Intl. Pat. Appln. No. PCT/IB2011/000037, issued on May 28, 2013, 5 pp.
(Continued)

*Primary Examiner* — Robert Clemente
(74) *Attorney, Agent, or Firm* — Foley & Lardner LLP (57) ABSTRACT

Disclosed are embodiments for methods and devices for filtering undesired particles from a medium by bonding the undesired particles to attachment particles. In some embodiments, the methods include receiving a plurality of attachment particles into a volume, where the volume contains a plurality of undesired particles and the medium. The method may also include contacting the plurality of attachment particles and the plurality of undesired particles contained in the medium, resulting in formation of bonded particles in the medium. Contacting may result in collisions, causing bonding between some undesired particles and some attachment particles. Some embodiments of the method also include removing at least a portion of the medium and bonded particles from the volume through a filter coupled to the volume with an exhaust, the filter configured to capture the bonded particles while allowing the medium to pass through.

9 Claims, 5 Drawing Sheets

(56) References Cited

U.S. PATENT DOCUMENTS

| | | | |
|---|---|---|---|
| 3,926,593 A * | 12/1975 | Squires et al. | 95/276 |
| 4,146,371 A * | 3/1979 | Melcher et al. | 95/62 |
| 4,203,736 A * | 5/1980 | Berz | 95/276 |
| 4,360,364 A * | 11/1982 | Kohl | 95/275 |
| 4,629,480 A * | 12/1986 | Margraf | 55/282 |
| 4,880,608 A * | 11/1989 | Stelman | 423/244.01 |
| 5,312,598 A * | 5/1994 | Kersey et al. | 422/170 |
| 6,440,198 B1 * | 8/2002 | Yang et al. | 95/275 |
| 6,723,160 B2 | 4/2004 | Mackey et al. | |
| 6,783,572 B1 * | 8/2004 | Squires | 95/274 |
| 7,235,124 B2 | 6/2007 | Liu et al. | |
| 7,309,384 B2 * | 12/2007 | Brown et al. | 95/275 |
| 2003/0019356 A1 * | 1/2003 | Herden et al. | 95/108 |
| 2003/0196960 A1 | 10/2003 | Hughes | |
| 2004/0050254 A1 | 3/2004 | Tanaka et al. | |
| 2008/0026041 A1 | 1/2008 | Tepper et al. | |
| 2009/0314163 A1 | 12/2009 | Mayer et al. | |
| 2010/0282075 A1 * | 11/2010 | Force et al. | 95/12 |

FOREIGN PATENT DOCUMENTS

| | | |
|---|---|---|
| CN | 1099317 A | 3/1995 |
| JP | 2003-311108 A | 11/2003 |
| JP | 2006-258072 A | 9/2006 |

OTHER PUBLICATIONS

International Search Report and Written Opinion from International Application No. PCT/IB2011/000037 dated Jun. 7, 2011.
"About HEPA Air Filters," Achoo Allergy & Air Products, accessed at http://web.archive.org/web/20100322203917/http://www.achooallergy.com/about-hepa.asp, accessed on May 22, 2014, pp. 1-2.
"Adhesive," Wikipedia, accessed at http://web.archive.org/web/20101120173355/http://en.wikipedia.org/wiki/Adhesive, modified on Nov. 16, 2010, pp. 1-11.
"Microporous Membranes," GE Osmonics Labstore, accessed at http://web.archive.org/web/20061030061831/http://www.osmolabstore.com//OsmoLabPage.dll?BuildPage&1&1&1022, accessed on May 22, 2014, pp. 1-4.
Huong, N.T., et al., "Surface modification of iron oxide nanoparticles and their conjuntion with water soluble polymers for biomedical application," Journal of Physics, vol. 187, No. 1, pp. 1-5 (2009).
Narh, K.A., et al., "Improving the Dispersion of the Carbon Nanotubes in Polymer Based Nanocomposites by Dry Coating," Antec, pp. 2199-2203 (2007).

* cited by examiner

FILTERING NANOPARTICLES BY BONDING WITH MICROPARTICLES

CROSS-REFERENCE TO RELATED APPLICATION

The present application claims priority to Indian patent application serial number 2785/DEL/2010 filed on Nov. 23, 2010, the entire contents of which is incorporated by reference. The present application is a U.S. National Phase Application pursuant to 35 U.S.C. §371 of International Application No. PCT/IB2011/000037 filed on Jan. 12, 2011, the entire contents of which are herein incorporated by reference.

BACKGROUND

Unless otherwise indicated herein, the materials described in this section are not prior art to the claims in this application and are not admitted to be prior art by inclusion in this section.

Airborne particles or molecular contaminants can be very small and difficult, if not impossible, to see with the naked eye. Some particles can be difficult to remove from the air. Such particles can be inhaled, and prolonged exposure to such particles may cause respiratory disorders and other diseases. Removal of particles from breathable air is a global challenge.

A filter, such as a high efficiency particulate air or HEPA filter, may be used to remove particulate matter, for example. A HEPA filter functions by having an arrangement of randomly placed fibers that the air containing the particulate matter is passed over so that the particles become trapped by the fibers. Particulate matter may include dust, pollen, mold, bacteria, etc., and these types of filters are either cleaned or replaced over time as particles accumulate on the filter.

SUMMARY

Disclosed are embodiments for methods and devices for filtering undesired particles from a medium by bonding the undesired particles to attachment particles. In some embodiments, the methods include receiving a plurality of attachment particles into a volume, where the volume contains a plurality of undesired particles and the medium. The method may also include contacting the plurality of attachment particles and the plurality of undesired particles contained in the medium, resulting in formation of bonded particles in the medium. Contacting may result in collisions, causing bonding between some undesired particles and some attachment particles. Some embodiments of the method also include removing at least a portion of the medium and bonded particles from the volume through a filter coupled to the volume with an exhaust, the filter configured to capture the bonded particles while allowing the medium to pass through.

The attachment particles used in various embodiments may be starch particles, cellulose particles, chitin particles, derivatives thereof, or mixtures thereof. The nanoparticles used in various embodiments may be carbon nanoparticles, iron particles, silicon particles, or mixtures thereof. The medium may be a gas or a liquid depending on the embodiment. In other embodiments, the exhaust may be a fan, a pump, a vacuum, or a pressure gradient.

In some embodiments, the contacting step may include mechanical agitation of the medium or ultrasonic agitation of the medium. In other embodiments, the contacting step may include a physical movement of the medium. In further embodiments, the contacting step may include applying gravitational forces, that is, allowing gravitational forces to act upon the medium.

Another embodiment discloses an apparatus for filtering undesired particles from a medium by bonding the undesired particles to attachment particles. In some embodiments, the device includes a collision volume containing a plurality of undesired particles and the medium. The devices may also include an injector configured to introduce a plurality of attachment particles into the collision volume. In some embodiments, the apparatus includes a collision chamber containing the collision volume, where the collision chamber is configured to cause attachment particles and undesired particles to contact or collide. In various embodiments, the contact or collisions result in bonded particles as collisions cause bonding between some undesired particles and some attachment particles. Further embodiments of the apparatus include a filter coupled to the collision chamber, the filter configured to capture the bonded particles when at least a portion of the medium from the volume is evacuated through the filter.

Another embodiment for a method for filtering undesired particles from a medium by bonding the undesired particles to attachment particles features receiving a gas or liquid medium into a volume of a collision chamber containing a plurality of attachment particles, where the medium contains a plurality of undesired particles. In some embodiments, the method includes contacting the plurality of attachment particles and the plurality of undesired particles in the collision chamber, resulting in bonded particles from bonding between at least one undesired particle and at least one attachment particle. Additional embodiments also include removing the bonded particles from the collision chamber.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Devices, methods, and articles of manufacture related to filtering of a medium are disclosed herein.

Methods

Briefly stated, techniques disclosed herein are generally related to methods and devices for separating undesired particles from a medium by contacting the undesired particles and the attachment particles to form bonded particles, and separating the bonded particles from the medium. The medium can contain undesired particles, or can be suspected of containing undesired particles.

The undesired particles can generally be any particles that are to be separated from the medium. Examples of undesired particles are (but not limited to) carbon particles, silicon particles, iron particles, silica particles, and mixtures thereof. Additional examples of undesired particles include dust, pollen, mold, bacteria, and mixtures thereof. Additional examples of undesired particles include nano-tubes or fullerene. For example, a carbon nanotube is a lattice structure of carbon atoms that forms a shape of about a long tube. A diameter of the tube may be as small as about a few nanometers. The undesired particles can generally be of any size. The undesired particles can be visible to the naked eye, or invisible to the naked eye. For example, the undesired particle can be a "nanoparticle" having dimensions in the range of about 0.1 nanometers to about 100 nanometers. For substantially spherical particles, average diameters are commonly used as measurements of the particle size. The undesired particles can have a uniform size, or can have a distribution of sizes. The undesired particles can be the same size as the attachment particles, can be smaller than the attachment particles, or can be larger than the attachment particles. The undesired particles can be of a size such that the undesired particles can remain suspended in air for an extended period of time. The undesired particles can be colored or colorless. If both the undesired particles and the attachment particles are colored, the undesired particles can be the same color or a different color from the attachment particles. The undesired particles can be lighter in color or darker in color from the attachment particles.

The medium can generally be any material in which the undesired particles can be present. For example, the medium can be a gas, a liquid, or a gel. Common examples of a medium are air or water.

The attachment particles can generally be any particles that can bond to the undesired particle to form a bonded particle. One or more different attachment particles can be used. The attachment particles can generally be of any size. The attachment particles can be "microparticles" having dimensions in the range of about 1 micrometer to about 1,000 micrometers. The attachment particles can alternatively have dimensions greater than about 1,000 micrometers. The attachment particles can have a uniform size, or can have a distribution of sizes. For substantially spherical particles, average diameters are commonly used as measurements of the particle size. The attachment particles can be the same size as the undesired particles, can be smaller than the undesired particles, or can be larger than the undesired particles. The attachment particles can be colored or colorless.

One set of attachment particles is biological polymers. A specific example of an attachment particle is a starch particle. Starch has attractive adhesion properties due at least in part to its formation of many chains, branched complex structures with different types of linkages, ionic bonding in nature, and starch naturally contains about 10-20% water, for example.

Starch particles of approximately uniform size may be obtained by sieving. Starch particles of relatively large size, e.g., greater than about 200 micrometer in diameter, may be used with contaminated air, for example. Other microparticles that have similar bonding properties, such as dextrin microparticles, cellulose microparticles, chitin microparticles, and modified starch cellulose chitins or their derivatives can also be used with example methods and devices herein.

In some example methods, the undesired particles are present in a gaseous medium such as air. Additional examples further include, introducing air containing undesired nanoparticles into a collision chamber containing a plurality of attachment particles. Further examples include inducing collisions or inducing contact between the undesired nanoparticles and the attachment particles, and when nanoparticles and microparticles collide, a bonded particle may be formed.

In an example embodiment, attachment particles for bonding to the undesired particles are selected based on associated physical properties, such as surface adhesion and physical size. In some embodiments, attachment particles are selected based on an ability to chemically or electrically bond with the undesired particles or bonding through van der Waals forces, for example. In various embodiments, once bonded particles are created, the air containing the bonded particles is passed through a filter. The filter can be designed to allow air to pass while trapping the bonded particles.

The methods can also include separating the bonded particles from the medium. The methods can also include detecting the bonded particles, before, after, or during the separation step.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Devices

By way of example, FIG. 1 is an example apparatus to perform filtering according to some of methods presented herein. The filtering system 100 can be configured with at least one intake 102. The filtering system can be configured with at least one collision chamber 110. The intake allows a contaminated medium to enter a collision chamber 110.

In some embodiments the intake 102 may contain at least one first filter element 104 designed to filter particles from the intake 102. The particles that are filtered could be micro-size particles or larger, for example. Larger particles may be removed leading to an overall increase in system efficiency. However, the filter element 104 may not be present in some embodiments, allowing contaminated medium to flow through the entirety of intake 102.

The filtering system 100 can further include at least one inlet such as the plurality of inlets 116 that are connected to the intake 102 and receive portions of medium from the intake 102. Each of the plurality of inlets 116 may include at least one second filter 106 . The collision chamber 110 may hold or include a plurality of attachment particles 114, such as particles in size on a micro scale, and the second filter 106 may prevent the plurality of attachment particles 114 from leaving the collision chamber 110. In some embodiments, any of the second filters 106 may be omitted. Positive pressure created by flow through intake 102 would prevent attachment particles from leaving the collision chamber 110, for example.

When medium flows though the plurality of inlets 116, optionally containing a second filter 106 , the medium enters the collision chamber 110. Within collision chamber 110, the contaminated medium interacts with attachment particles 114.

In some embodiments, the flow of medium through the inlets 116 may cause the plurality of attachment particles 114 to become suspended within collision chamber 110. The suspended attachment particles may collide with other particles present in the medium. The flow through the inlets 116 combined with other forces such as gravity may cause the attachment particles 114 to move throughout the collision chamber 110. A suspension or dispersion of the attachment particles 114 increases the likelihood of an attachment particle colliding with at least one undesired particle. In some cases, many attachment particles 114 may bond to a single undesired particle. Each attachment particle 114 may have a plurality of undesired particles bond to a surface. For example, a single attachment particle 114 may have hundreds of undesired particles bond to a surface. In one example, where the attachment particles 114 are microparticles, and the undesired particles are nanoparticles, one or more nanoparticles may bond to a microparticle, such as for example, one or more dust or pollen air particles may bond to a starch particle.

The collision chamber 110 may contain at least one filter 108. The filter 108 may be placed within the collision chamber 110, as shown, or within one or more exhausts shown at the top of the collision chamber 110. The filter 108 can be configured to prevent particles at least a size of the attachment particles 114 from passing through the exhaust at the top of the collision chamber 110. A bonded particle formed by bonding one or more undesired particles with an attachment particle 114 may be approximately the same size as the particle 114 if the undesired particles are substantially smaller than the attachment particles. In this situation, filter that can remove attachment particles from the medium will also remove bonded particles from the medium. In some embodiments, the attachment particles 114 may be a light color and the undesired particles may be a dark color. After a sufficient amount of undesired particles has bonded to the particles 114, the plurality of attachment particles 114 may appear to have a darker color, for example.

Different types of filters can be used in embodiments for the filter 108. In some embodiments, a HEPA filter designed to filter particles a size of the attachment particles 114 can filter the medium. In some embodiments, filter 108 will filter particles at least the size of the attachment particles 114. The filter 108 may be of a size such that flow is not substantially impeded, for example. Other various particle filters may be incorporated as part of filter 108. The various filters are meant to be non-limiting and provide examples of filters that can be used in embodiments of the present disclosure.

Figure 1:
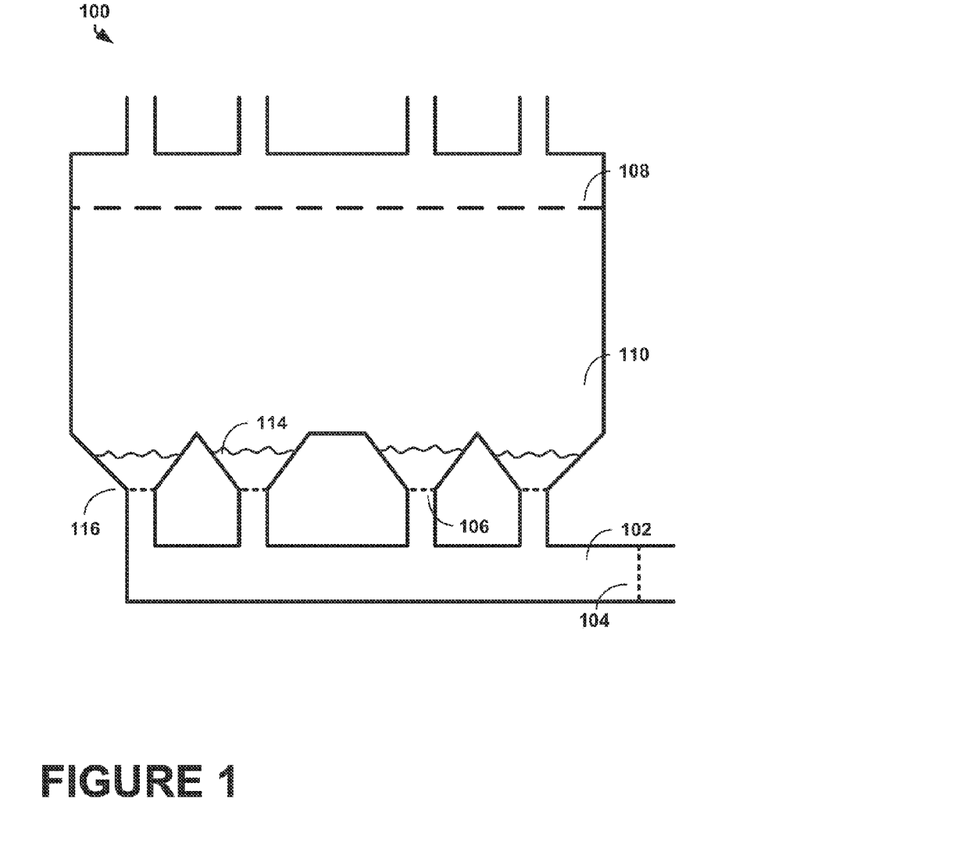
FIG. 1 is an example apparatus to perform filtering.

In some embodiments, the exhaust at the top of the collision chamber 110 are used to evacuate the medium from the collision chamber 110. Apparatus 100 may have one exhaust, or the apparatus 100 may have a plurality of exhausts as shown in FIG. 1. In various embodiments, a fan may be used to pull air (or other medium) through the filter 108 and out the exhaust at the top of the collision chamber 110. In further embodiments, the exhausts at the top of the collision chamber 110 may be coupled to a pump for evacuation of the collision chamber 110. A pump can create a suction force to remove some of the medium through the filter 108 and out the exhausts at the top of the collision chamber 110.

Within additional embodiments, a vacuum can be coupled to the exhausts at the top of the collision chamber 110 to provide a suction force to evacuate the medium from the collision chamber 110 Some embodiments may use a pressure gradient to evacuate the collision chamber 110, for example. In some embodiments, the pressure gradient can be created by the Bernoulli principle; e.g., air flowing quickly across the exhausts at the top of the collision chamber 110 may create a suction force pulling air out of the collision chamber 110.

Figure 2:
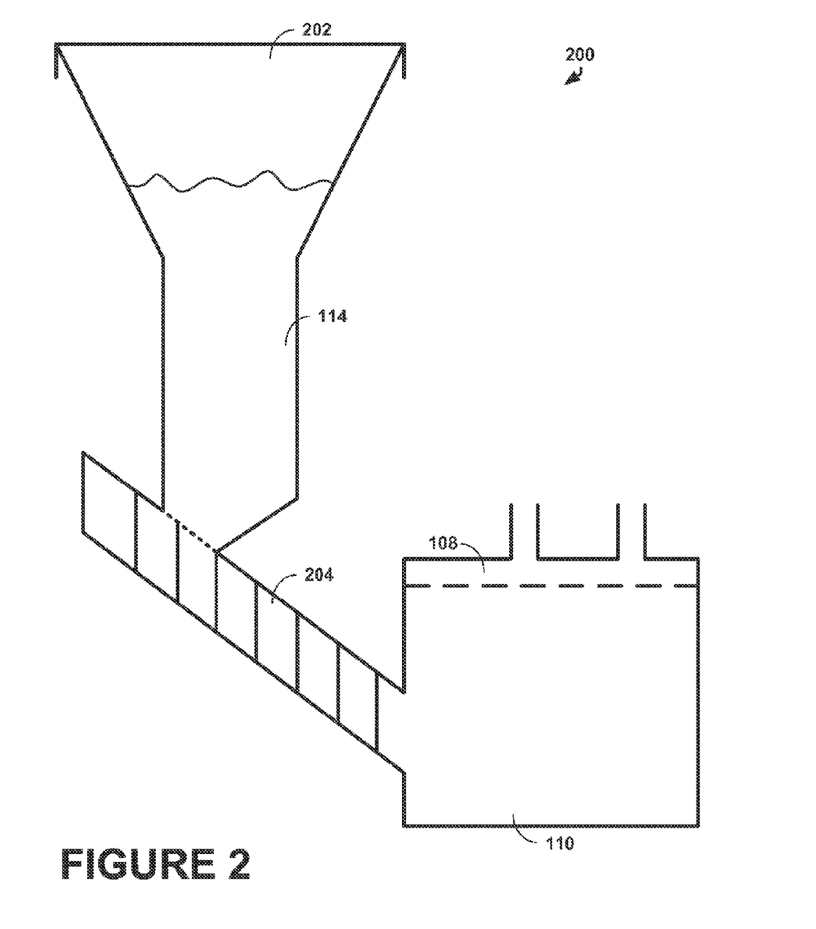
FIG. 2 is another example apparatus 200 to perform filtering.

FIG. 2 is another example apparatus 200 to perform filtering according to some of methods presented herein. The apparatus 200 includes a collision chamber 110, which may include a filter 108 and exhausts at the top of the collision chamber 110.

The apparatus 200 also includes an injector 204 connected to the collision chamber 110. In some embodiment, like that shown in FIG. 2, the injector 204 may be a cork screw injector. The injector 204 is configured to introduce an amount of attachment particles 114 into the collision chamber 110. Attachment particles 114 may be contained in a reservoir 202, and the reservoir 202 is coupled to the collision chamber 110 by the injector 204.

In some embodiments, an amount of potentially contaminated air may be introduced into the collision chamber 110 via the exhausts at the top of the collision chamber 110. While the contaminated air is in the collision chamber 110, attachment particles 114 may be introduced into the collision chamber 110 via the injector 204. In some embodiments, attachment particles 114 may be injected into the collision chamber 110 with pressurized air through a nozzle of the injector 204. In other embodiments, attachment particles 114 may be introduced through an opening in the collision chamber 110 using gravity, for example. In further embodiments, the attachment particles 114 may be sealed inside the collision chamber 110, for example.

In an example embodiment, collisions can be induced once attachment particles 114 are injected into the collision chamber 110. In one embodiment, collisions are induced by circulation of a medium in the collision chamber 110 containing the undesired air particles. For example, if the contaminated air contained undesired nanoparticles, circulation of air through the collision chamber 110 may cause attachment particles 114 and the undesired nanoparticles to collide and form bonded particles. Further examples may include a mechanical agitation of the medium or ultrasonic agitation of the medium. The mechanical agitation may be provided by a movement or vibration of the collision chamber 110, for example.

In an additional embodiment, agitation of the medium may be provided by a fan mounted within the collision chamber 110. In addition, or alternatively, gravitational forces may cause collisions of various particles within the collision chamber 110. When attachment particles 114 are injected into the collision chamber 110, gravity may pull the attachment particles 114 to a bottom of the collision chamber 110, which may further increase a number of collisions within the collision chamber 110.

After inducing collisions or inducing contact between the attachment particles 114 and the undesired particles in the collision chamber, bonded particles are formed and can be filtered out of the medium in the collision chamber 110 through the exhausts at the top of the collision chamber 110. Further embodiments may recycle attachment particles 114 caught by filter 108. Once an attachment particle has been retained on a filter, the attachment particle 114 may have the possibility of capturing more undesired particles, for example. Thus, once attachment particles 114 are collected from the filter 108, the attachment particles 114 may optionally be reintroduced into the reservoir 202. In some embodiments, the attachment particles may be a light color and the undesired particles may be a dark color. After a sufficient amount of undesired particles has bonded to the attachment particles, the plurality of attachment particles will appear to have a darker color. The plurality of attachment particles may continue to be reused until the color darkens to a predefined level, for example.

Figure 3:
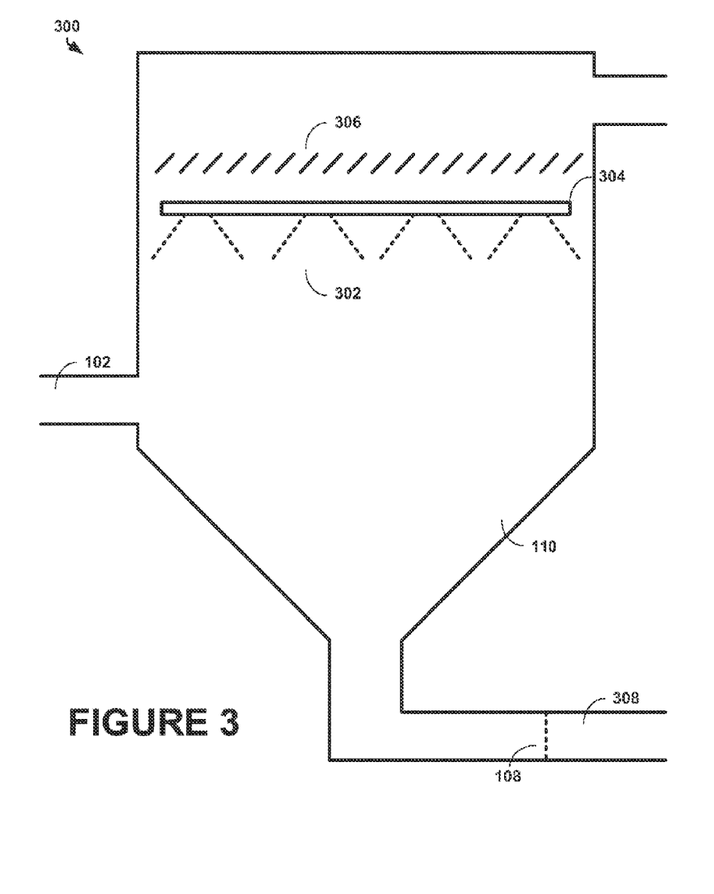
FIG. 3 is an example wet scrubber apparatus.

FIG. 3 is an example wet scrubber apparatus 300 configured to perform filtering according to methods presented herein. The wet scrubber apparatus 300 acts as a filter to remove types of undesired particles from a medium. The wet scrubber apparatus 300 is configured with an intake 102. The intake 102 is used to draw medium contaminated with undesired particles into a collision chamber 110. Within the collision chamber 110, a liquid slurry 302 is sprayed. The liquid slurry 302 may be a water and starch microparticle solution. In some embodiments, a liquid other than water may be used, such as for example ethyl alcohol or isopropyl alcohol. The liquid slurry 302 may be introduced via a pipe 304 in the collision chamber 110. The pipe 304 may have spray nozzles attached to control a flow of the liquid slurry 302.

The liquid slurry 302 may be sprayed in such a way to maximize an exposed surface area of the water, such as sprayed in a fine mist for example. When the liquid slurry 302, attachment particles (e.g., such as starch microparticles) collide with undesired particles in the contaminated air to form a solution with the slurry. Once in the slurry solution, the undesired particles may bind to an attachment particle in the slurry solution. The undesired particle may be attracted to both the water and attachment particle comprising the slurry solution, for example.

In further embodiments, the liquid slurry 302 may be drained via a drain 3108. For example, the liquid slurry 302 is sprayed into the collision chamber 110 to collide with undesired particles in the air introduced through the intake 102, and drained from the collision chamber 110 via the drain 308. The drained slurry may contain attachment particles, undesired particles, and bonded particles. The drained slurry may also be routed back to the pipe 304 to be reintroduced into the collision chamber 110 The slurry may have a high capacity for undesired particle storage and may be used several times. In some embodiments, the drain 308 may include a filter 108 to filter the attachment particles and bonded particles from the slurry mixture. The filter 108 may be any filter suitable for removing particles from a liquid solution. If the liquid is to be reused by the system 300, additional attachment particles may be reintroduced to the liquid slurry, for example.

The system 300 also includes an exhaust at the top of the collision chamber 110 to evacuate the medium from the collision chamber 110. The system 300 may further include a demister pad 306. The exhaust at the top of the collision chamber 110 may provide a suction force, and the demister pad 306 may prevent the slurry mixture from being sucked into the exhaust at the top of the collision chamber 110. The demister pad 306 is configured to allow gas to flow into the exhaust at the top of the collision chamber 110 and to maintain the slurry within the collision chamber 110, for example.

The example apparatuses presented are meant as examples of apparatus to perform the filtering methods described herein. Other apparatus may be used that cause attachment particles to collide with undesired particles to form a bonded particle, where the bonded particle is removed from the medium. For example, contaminated air may be percolated through a solution containing attachment particles.

Figure 4A:
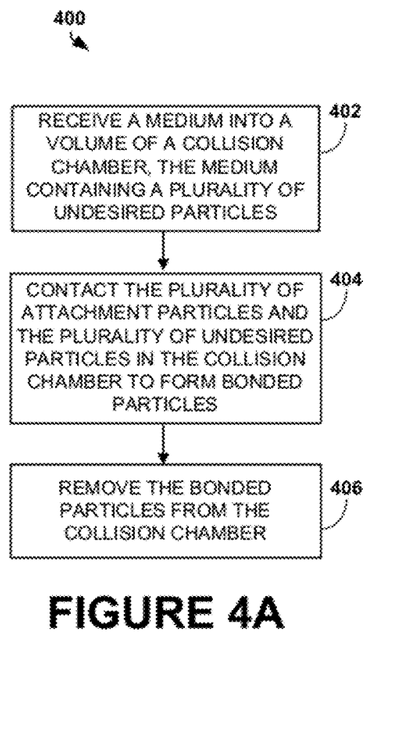
FIG. 4A is a functional block diagram of one embodiment of a method for filtering undesired particles.

FIG. 4A is a functional block diagram of one embodiment of a method for filtering undesired particles, in accordance with at least some embodiments described herein. In some examples, method 400 shown in FIG. 4A presents an alternate embodiment of a method that, for example, could be used with the apparatus 100, the apparatus 200, and the apparatus 300. Method 400 may include one or more operations, functions, or actions as illustrated by one or more of blocks 402, 404, and 406. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 400 may begin at block 402, "RECEIVE A MEDIUM INTO A VOLUME OF A COLLISION CHAMBER, THE MEDIUM CONTAINING A PLURALITY OF UNDESIRED PARTICLES." In some examples of block 402, a plurality of undesired particles is received into a volume containing a medium.

Block 402 may be followed by block 404, "CONTACT THE PLURALITY OF ATTACHMENT PARTICLES AND THE PLURALITY OF UNDESIRED PARTICLES IN THE COLLISION CHAMBER TO FORM BONDED PARTICLES." In some examples of block 404, the undesired particles may be carbon nanoparticles, iron nanoparticles, or silicon nanoparticles. The undesired particles may be of a size on the scale of nanoparticles, for example. In additional examples, contact between the plurality of attachment particles and the plurality of undesired particles can be induced once attachment particles are injected into a collision chamber. In one embodiment, contact is induced by circulation of the medium containing the undesired particles. Further examples may include a mechanical or ultrasonic agitation of the medium. The mechanical agitation may be provided by a movement or vibration of the collision chamber. In an additional embodiment, the mechanical agitation of the medium may be provided by a fan mounted within the collision chamber. In an additional embodiment, gravitational forces cause the collisions within the collision chamber. When microparticles are injected into the collision chamber, gravity will pull them to the bottom, for example.

Block 404 may be followed by block 406, "REMOVE THE BONDED PARTICLES FROM THE COLLISION CHAMBER." In some examples of block 406, the medium is removed from the volume through a filter. The filter may be configured to trap particles that are the size of the attachment particles or larger. Thus, the filter may trap both attachment particles and the bonded particles.

Figure 4B:
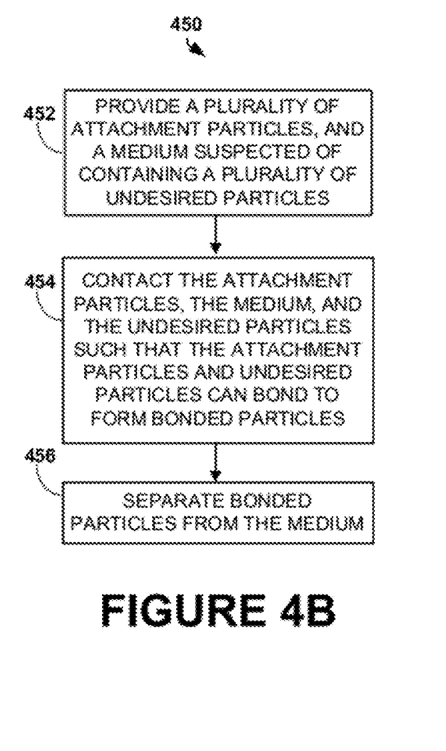
FIG. 4B is a functional block diagram of one embodiment of a method for filtering undesired particles.

FIG. 4B is a functional block diagram of one embodiment of a method for filtering undesired particles, in accordance with at least some embodiments described herein. In some examples, method 450 shown in FIG. 4B presents an alternate embodiment of a method that for example could be used with the apparatus 100, the apparatus 200, and the apparatus 300. Method 450 may include one or more operations, functions, or actions as illustrated by one or more of blocks 452, 454, and 456. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 450 may begin at block 452, "PROVIDE A PLURALITY OF ATTACHMENT PARTICLES, AND A MEDIUM SUSPECTED OF CONTAINING A PLURALITY OF UNDESIRED PARTICLES." In some examples of block 452, a medium suspected of containing undesired particles is provided along with a plurality of attachment particles.

Block 452 may be followed by block 454, "CONTACT THE ATTACHMENT PARTICLES, THE MEDIUM, AND THE UNDESIRED PARTICLES SUCH THAT THE ATTACHMENT PARTICLES AND UNDESIRED PARTICLES CAN BOND TO FORM BONDED PARTICLES." In some examples of block 404, contact between particles can occur once attachment particles and medium are contacted. In one embodiment, contact is induced by the circulation of the medium containing the undesired particles. Further examples may include a mechanical or ultrasonic agitation of the medium. The mechanical agitation may be provided by a movement or vibration of the collision chamber. In an additional embodiment, the mechanical agitation of the medium may be provided by a fan mounted within the collision chamber. In an additional embodiment, gravitational forces cause the collisions within the collision chamber. For example, when attachment particles are injected into the collision chamber, gravity will pull them to the bottom. By taking advantage of this phenomenon, potential contact can be increased. In some examples, the contact may occur in a liquid medium. The attachment particles may be present in a liquid medium and when the liquid and undesired particles come in contact, the undesired particles form a solution, suspension, or dispersion with the liquid and the attachment particles. Bonding between the various particles may occur in the solution.

Block 454 may be followed by block 456, "SEPARATE BONDED PARTICLES FROM THE MEDIUM." In some examples of block 456, the medium may be extracted from the volume through a filter. The filter may be configured to trap particles that are the size of the attachment particles or larger. Thus, the filter may trap both the attachment particles and the bonded particles and separate the bonded particles from the medium. In additional examples of block 456, the attachment particles may be present in a liquid medium and bonding between attachment particles and undesired particles may occur in a liquid solution, such as a wet scrubber apparatus. Block 456 may remove the liquid solution, containing the attachment particles, undesired particles, and bonded particles from the collision chamber. The medium originally containing the undesired particles can pass through the collision chamber once the undesired particles have been removed.

Figure 5A:
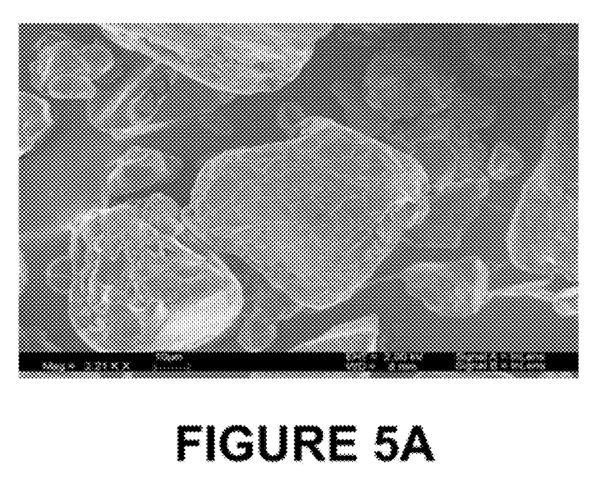
FIG. 5A is an illustration of example attachment particles.

FIG. 5A is an illustration of example attachment particles. FIG. 5A depicts particles of starch. In various embodiments, starch particles may be used to as bonding agents to bond with undesired particles. Attachment particles may be screened so the particles are all approximately the same or similar in size. Starch and related polymers exist in different sizes, starting from about 1 micrometer to a thousand micrometers or more in diameter, and starch of the size on the scale of micrometers in diameter can be used in some examples.

Starch of a size greater than about 200 micrometers in diameter may be used, in one example, in devices and methods described herein. Slightly contaminated starch, such as starch having bonded undesirable particles, can be recycled as raw material for processes where starch is used, and thus, can be reused in the devices and methods described herein.

In some embodiments, other particles having similar bonding properties to starch, such as dextrin particles, cellulose particles, and chitin particles, can also be used with the methods and devices herein. For example, the starch polymer holds different charge zones associated with monomer units and this distribution of charge on starch molecule helps to trap undesired particles. Other polymers, such as bio-polymers, that show adhesion properties similar to the starch adhesion properties can be suitable bonding agents as well.

Figure 5B:
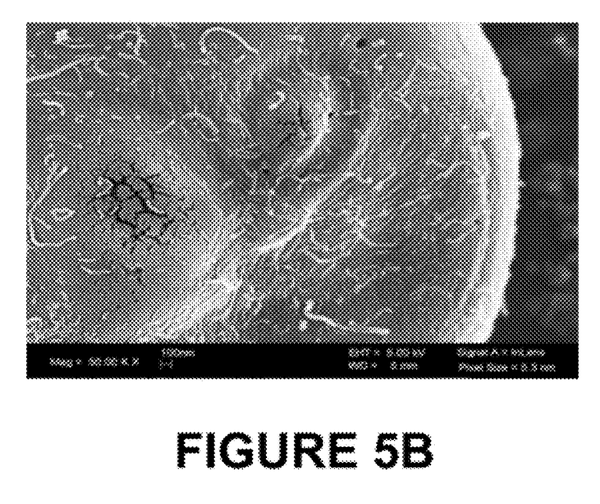
FIG. 5B is an illustration of an example magnified view of a bonded particle.

FIG. 5B is an illustration of an example magnified view of a bonded particle. The bonded particle of FIG. 5B may be a microparticle 500 attached to a nanoparticle 502. A relative size of the example microparticle and attached nanoparticle can be seen in FIG. 5B. Several nanoparticles are shown bonded the microparticle, such as nanoparticle 502, leaving space for many more nanoparticles to bond. In this example drawing, carbon nanotubes are shown as nanoparticles bonded to a starch microparticle.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for filtering particles from a medium by bonding the particles to attachment particles, the method comprising:
    providing a plurality of attachment particles, and a medium suspected of containing a plurality of undesired particles, wherein the attachment particles comprise starch microparticles, cellulose microparticles, chitin microparticles, derivatives thereof, or mixtures thereof;
    contacting the attachment particles, the medium, and the undesired particles such that the attachment particles and undesired particles can bond to form bonded particles; and
    separating bonded particles from the medium.

2. The method of claim 1, wherein the separating step comprises use of a fan, a pump, a vacuum, or a pressure gradient.

3. The method of claim 1, wherein the contacting step comprises mechanical agitation of the medium or ultrasonic agitation of the medium.

4. The method of claim 1, wherein the separating step comprises filtering the bonded particles.

5. The method of claim 1, wherein the attachment particles have dimensions of about 1 micrometer to about 1,000 micrometers; and wherein the undesired particles have dimensions of about 0.1 nanometers to about 100 nanometers.

6. The method of claim 1, wherein the medium is a gas, a liquid, or a mixture thereof.

7. A method for filtering particles from a medium by bonding the particles to attachment particles, the method comprising:
    providing a plurality of attachment particles, and a medium suspected of containing a plurality of undesired particles, wherein the undesired particles are carbon nanoparticles, iron nanoparticles, silicon nanoparticles, or mixtures thereof;
    contacting the attachment particles, the medium, and the undesired particles such that the attachment particles and undesired particles can bond to form bonded particles; and
    separating bonded particles from the medium.

8. A method for filtering undesired particles from a medium by bonding the undesired particles to attachment particles, the method comprising:
    receiving a medium into a volume of a collision chamber, the medium containing a plurality of undesired particles, wherein the medium is a gas or a liquid, and wherein the volume contains a plurality of attachment particles, and wherein the attachment particles comprise starch microparticles, cellulose microparticles, chitin microparticles, or mixtures thereof;
    contacting the plurality of attachment particles and the plurality of undesired particles in the collision chamber to form bonded particle; and
    removing the bonded particles from the collision chamber.

9. A method for filtering undesired particles from a medium by bonding the undesired particles to attachment particles, the method comprising:
    receiving a medium into a volume of a collision chamber, the medium containing plurality of undesired particles, wherein the medium is a gas or a liquid, and wherein the volume contains a plurality of attachment particles, and wherein the undesired particles comprise carbon nanoparticles, iron nanoparticles, silicon nanoparticles, or mixtures thereof;
    contacting the plurality of attachment particles and the plurality of undesired particles in the collision chamber to form bonded particle; and
    removing the bonded particles from the collision chamber wherein the undesired particles are carbon nanoparticles, iron nanoparticles, silicon nanoparticles, or mixtures thereof.

* * * * *

UNITED STATES PATENT AND TRADEMARK OFFICE
CERTIFICATE OF CORRECTION

| | | |
|---|---|---|
| PATENT NO. | : 8,845,792 B2 | Page 1 of 1 |
| APPLICATION NO. | : 13/263998 | |
| DATED | : September 30, 2014 | |
| INVENTOR(S) | : Paul | |

It is certified that error appears in the above-identified patent and that said Letters Patent is hereby corrected as shown below:

On the Title Page, Item (56), under "FOREIGN PATENT DOCUMENTS", in Column 2, Line 1, delete "CA 2706274 12/2010".

On Title Page 2, Item (56), under "OTHER PUBLICATIONS", in Column 2, Line 15, delete "conjuntion" and insert -- conjunction --, therefor.

In the Specification,

In Column 4, Line 58, delete "106 ." and insert -- 106. --, therefor.

In Column 4, Line 67, delete "106 ," and insert -- 106, --, therefor.

In Column 5, Line 28, delete "exhaust" and insert -- exhausts --, therefor.

In Column 5, Line 33, delete "filter" and insert -- a filter --, therefor.

In Column 5, Line 51, delete "exhaust" and insert -- exhausts --, therefor.

In Column 5, Line 57, delete "exhaust" and insert -- exhausts --, therefor.

In Column 5, Line 66, delete "110" and insert -- 110. --, therefor.

In Column 7, Line 31, delete "3108." and insert -- 308. --, therefor.

In Column 7, Line 38, delete "110" and insert -- 110. --, therefor.

In the Claims,

In Column 12, Line 51, in Claim 9, delete "containing" and insert -- containing a --, therefor.

Signed and Sealed this
Twenty-fourth Day of March, 2015

Michelle K. Lee
*Director of the United States Patent and Trademark Office*